(12) United States Patent
Park et al.

(10) Patent No.: US 8,783,957 B2
(45) Date of Patent: Jul. 22, 2014

(54) ABS MOTOR FOR VEHICLES

(75) Inventors: Kyungsang Park, Seoul (KR); Musung Jung, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 107 days.

(21) Appl. No.: 13/389,916

(22) PCT Filed: Aug. 11, 2010

(86) PCT No.: PCT/KR2010/005276
§ 371 (c)(1),
(2), (4) Date: Feb. 10, 2012

(87) PCT Pub. No.: WO2011/019208
PCT Pub. Date: Feb. 17, 2011

(65) Prior Publication Data
US 2012/0141059 A1 Jun. 7, 2012

(30) Foreign Application Priority Data
Aug. 11, 2009 (KR) .................. 10-2009-0073720

(51) Int. Cl.
*F16C 19/50* (2006.01)
(52) U.S. Cl.
USPC ........................................ 384/447
(58) Field of Classification Search
USPC ............... 384/447; 92/72; 303/10; 417/273; 91/492
See application file for complete search history.

(56) References Cited

U.S. PATENT DOCUMENTS

| 1,488,528 | A | * | 4/1924 | Cardini ........................... 91/492 |
| 2,472,355 | A | * | 6/1949 | Whittingham ................. 417/273 |
| 3,689,199 | A | * | 9/1972 | Bassinger ....................... 417/273 |
| 4,909,102 | A | * | 3/1990 | Haga .............................. 475/168 |
| 5,230,275 | A | * | 7/1993 | Hodge et al. ...................... 92/68 |
| 6,202,538 | B1 | * | 3/2001 | Scharinger et al. ............... 92/72 |
| 6,240,826 | B1 | | 6/2001 | Zernickel et al. |
| 6,272,970 | B1 | * | 8/2001 | Schaefer ........................... 92/72 |
| 6,732,631 | B1 | | 5/2004 | Bitzer et al. |
| 7,204,565 | B2 | * | 4/2007 | Hinz et al. ....................... 303/10 |
| 8,328,538 | B2 | * | 12/2012 | Smits ............................ 417/415 |

FOREIGN PATENT DOCUMENTS

| JP | 2003-502603 A | 1/2003 |
| JP | 2007-240003 A | 9/2007 |
| KR | 20-1999-0033917 U | 8/1999 |

OTHER PUBLICATIONS

International Search Report in International Application No. PCT/KR2010/005276, filed Aug. 11, 2010.

* cited by examiner

*Primary Examiner* — Thomas R Hannon
(74) *Attorney, Agent, or Firm* — Saliwanchik, Lloyd & Eisenschenk

(57) ABSTRACT

The present invention relates to an ABS motor for vehicles, characterized by: a motor body having a rotation shaft; a sleeve press-fitted to the rotation shaft, and provided at a periphery thereof with an upper bearing seat and a lower bearing seat each eccentrically provided; an upper needle bearing press-fitted into the upper bearing seat; and a lower needle bearing press-fitted into the lower bearing seat.

4 Claims, 3 Drawing Sheets

US 8,783,957 B2

ABS MOTOR FOR VEHICLES

CROSS-REFERENCE TO RELATED APPLICATION

This application is the U.S. national stage application of International Patent Application No. PCT/KR2010/005276, filed Aug. 11, 2010, which claims priority to Korean Application No. 10-2009-0073720, filed Aug. 11, 2009, the disclosures of each of which are incorporated herein by reference in their entirety.

TECHNICAL FIELD

The present invention relates to an ABS (Anti-lock Braking System) motor for vehicles, and more particularly to an ABS motor for vehicles configured to couple an eccentricity-shaped sleeve and a needle bearing to a conventional motor for an economic and reliable product.

BACKGROUND ART

FIG. 1 is a schematic view illustrating an installed state of an ABS motor. Referring to FIG. 1, the ABS motor is a direct current (DC) motor activated by an EBCM (Electronic Brake Control Module) in a case pressure-reduction is activated by an ABS, where in a case the ABS motor starts to perform a rotating movement, a needle bearing (3) eccentrically mounted on a rotation shaft (2) advances/backs up a plunger (5) of a return pump (4) to reduce pressure of brakes on locked wheels.

FIG. 2 is a schematic view illustrating a coupled structure between a conventional ABS motor and a needle bearing. Referring to FIG. 2, a conventional ABS motor is disadvantageous in that the rotation shaft (2) of a conventional ABS motor (1. hereinafter referred to as motor) is straightly processed, and a distal end of the rotation shaft (2) is eccentrically processed to increase a manufacturing cost and to rule out generality of the motor (1) due to disablement to other usages.

DISCLOSURE OF INVENTION

Technical Problem

The present invention is disclosed to provide an ABS motor for vehicles configured to easily couple two needle bearings to a rotation shaft of the motor via a sleeve at a predetermined angle.

Technical problems to be solved by the present invention are not restricted to the above-mentioned, and any other technical problems not mentioned so far will be clearly appreciated from the following description by skill in the art.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the disclosure, as embodied and broadly described, there is provided an ABS motor for vehicles, the motor characterized by: a motor body having a rotation shaft; a sleeve press-fitted to the rotation shaft, and provided at a periphery thereof with an upper bearing seat and a lower bearing seat each eccentrically provided; an upper needle bearing press-fitted into the upper bearing seat; and a lower needle bearing press-fitted into the lower bearing seat.

In some exemplary embodiments of the present invention, the ABS motor for vehicles may be further characterized by a compartment protruder interposed between the upper bearing seat and the lower bearing seat.

In some exemplary embodiments of the present invention, the ABS motor for vehicles may be further characterized by disengagement prevention devices each provided at an upper side of the upper bearing seat and at a lower side of the lower bearing seat to prevent the upper needle bearing and the lower needle bearing from being disengaged.

In some exemplary embodiments of the present invention, the ABS motor for vehicles may be characterized in that the lower bearing seat has a phase difference of 120° in the circumferential direction relative to the upper bearing seat.

Advantageous Effects of Invention

The present invention has advantageous effects in that two needle bearings are coupled to a rotation shaft of the motor via a sleeve designed to cater to a design structure of the needle bearings to ease the coupling work and to reduce assembling time. Another advantageous effect is that each needle bearing can be automatically and eccentrically assembled with an accurate phase difference to enhance the reliability of the product because each needle bearing is simply inserted into the sleeve during assemblage.

BEST MODE FOR CARRYING OUT THE INVENTION

The advantages, features and methods for achieving the foregoing will be apparent from the accompanying drawings and exemplary embodiments to follow.

Figure 1:
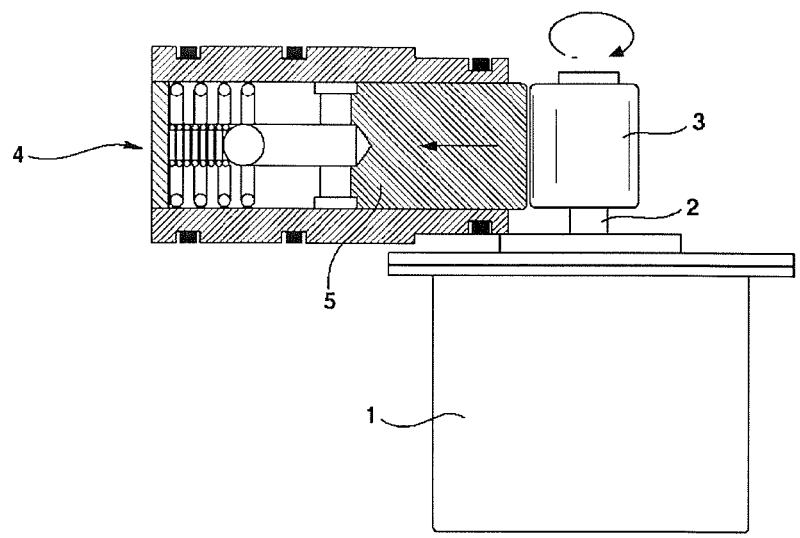
FIG. 1 is a schematic view illustrating a relationship between an ABS motor and a return pump.
Figure 2:
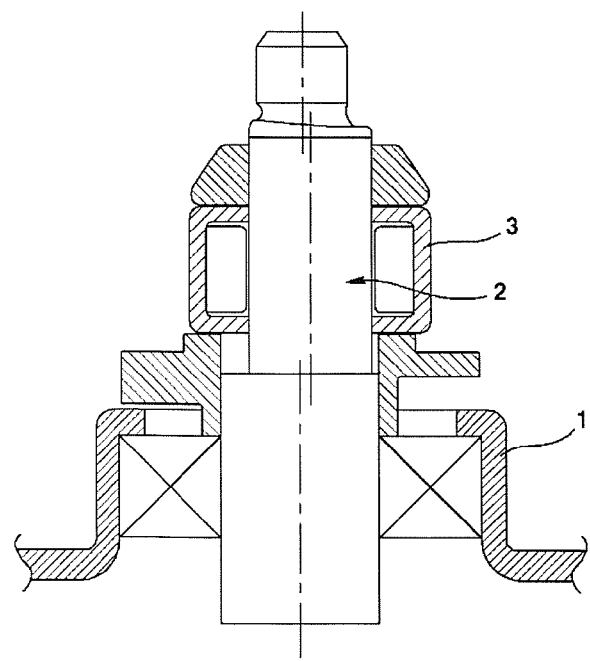
FIG. 2 is a schematic view illustrating a coupled structure between a conventional ABS motor and a needle bearing
Figure 3:
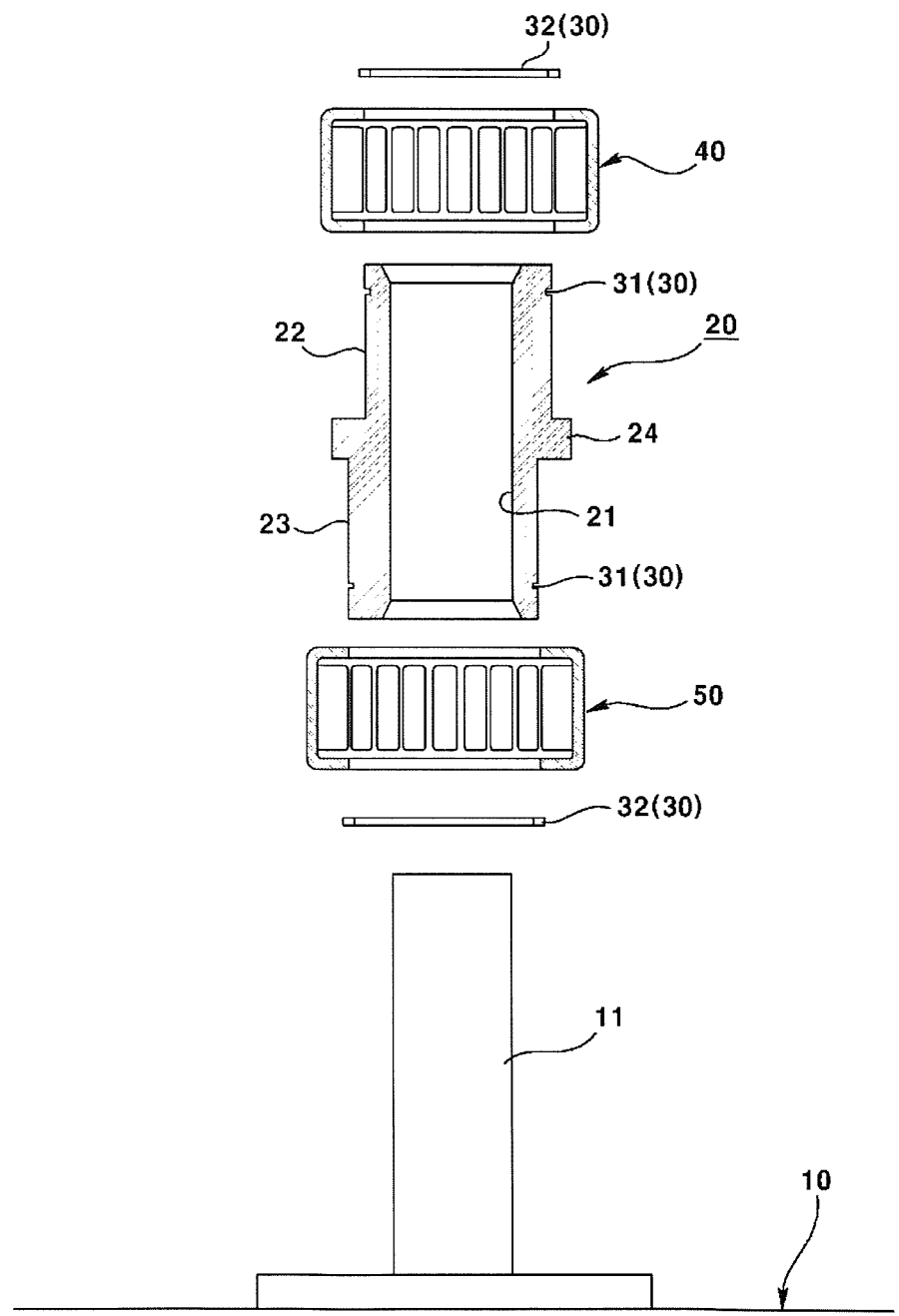
FIG. 3 is an exploded cross-sectional view illustrating an ABS motor for vehicles according to an exemplary embodiment of the present invention.
Figure 4:
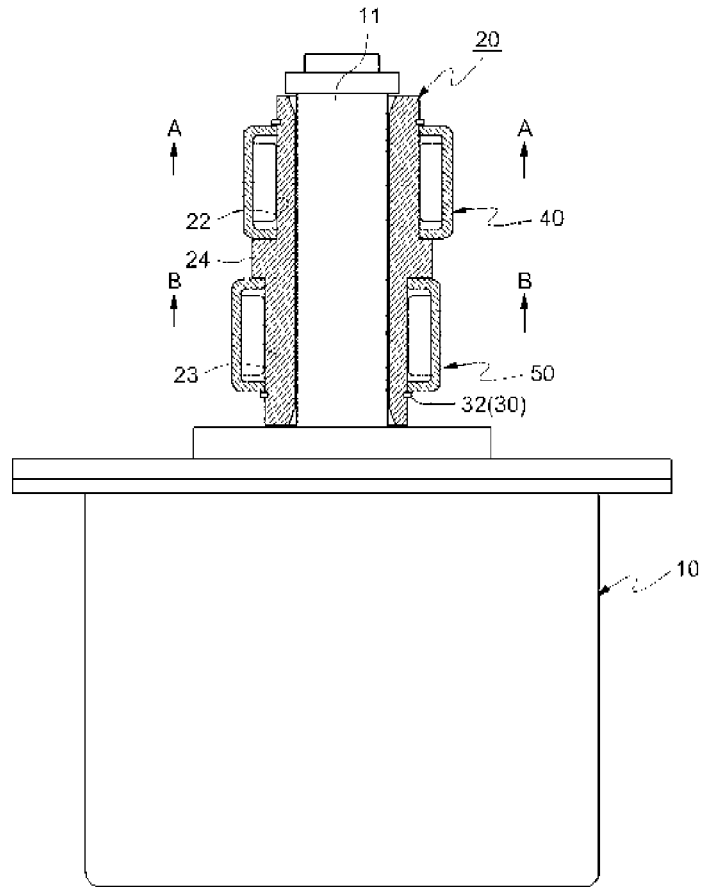
FIG. 4 is a cross-sectional view illustrating a coupled state of FIG. 3.

FIG. 3 is an exploded cross-sectional view illustrating an ABS motor for vehicles according to an exemplary embodiment of the present invention, and FIG. 4 is a cross-sectional view illustrating a coupled state of FIG. 3.

Referring to FIGS. 3 and 4, an ABS motor according to the present invention may include a motor body (10) having a rotation shaft (11), where the rotation shaft has a cylindrical shape. The ABS motor according to the present invention may further include a sleeve (20) that is press-fitted to the rotation shaft (11).

The rotation shaft (11) is inserted into an inner circumferential surface of a hollow part of the sleeve (20), and therefore, the sleeve (20) further includes at a center thereof a bore (21) for press-fitting to a periphery of the rotation shaft (11). The ABS motor further includes an upper bearing seat (22)

and a lower bearing seat (23) each provided at an upper peripheral side and a lower peripheral side of the sleeve (20).

The ABS motor according to the present invention may still further include a compartment protruder (24) provided between the upper bearing seat and the lower bearing seat of the sleeve (20) for dividing a needle bearing into an upper needle bearing and a lower needle bearing. At this time, the lower bearing seat has a phase difference of 120° in the circumferential direction relative to the upper bearing seat. The phase difference is designed in consideration of the fact that the upper and lower needle bearings press-fitted into each bearing seat should have a phase difference of 120°.

That is, an upper side and a lower side of the sleeve (20) are eccentrically disposed from a rotation center of the rotation shaft (11) while the upper side and the lower side of the sleeve (20) are respectively accommodated into the hollow part of the rotation shaft (11), and the degree of eccentricity is a phase difference of 120°, such that the phase difference is naturally formed while the needle bearings are coupled.

The ABS motor according to the present invention may include disengagement prevention devices (30) each press-fitted into an upper side of the upper bearing seat and a lower side of the lower bearing seat to prevent an upper needle bearing (40) and a lower needle bearing (50) from being disengaged. The disengagement prevention devices (30) may include circular grooves (31) each formed at upper and lower circumferential sides of the sleeve (20), and a snap ring (32) press-fitted into the each circular groove (31). However, the configuration is not limited to the above structure. Other various alternatives may be possible as long as the needle bearings are not disengaged.

Furthermore, the ABS motor according to the present invention may include an upper needle bearing (40) press-fitted into an upper bearing seat (22) of the sleeve (20). The ABS motor according to the present invention may further include a lower needle bearing (50) press-fitted into a lower bearing seat (23) of the sleeve (20). At this time, the upper needle bearing (40) and the lower needle bearing (50) spontaneously come to have a phase difference (120°), once the upper needle bearing (40) and the ower needle bearing (50) are press-fitted into the upper bearing seat (22) and the lower bearing seat (23) that are designed with a predetermined phase difference.

Based on the foregoing configuration, the upper and lower needle bearings (40, 50) are eccentrically disposed relative to the rotation center of the rotation shaft (11), and are mutually disposed with the given phase difference.

Now, an assembling process and action of the ABS motor according to the present invention will be described in detail.

Mode for the Invention

As in FIG. 3, the upper bearing seat (22) of the sleeve (20) is press-fitted by the upper needle bearing (40), and the lower bearing seat (23) of the sleeve (20) is press-fitted by the lower needle bearing (50), whereby the upper needle bearing (40) and the lower needle bearing (50) are partitioned by the compartment protruder (24) that is interposed therebetween.

Figure 5:
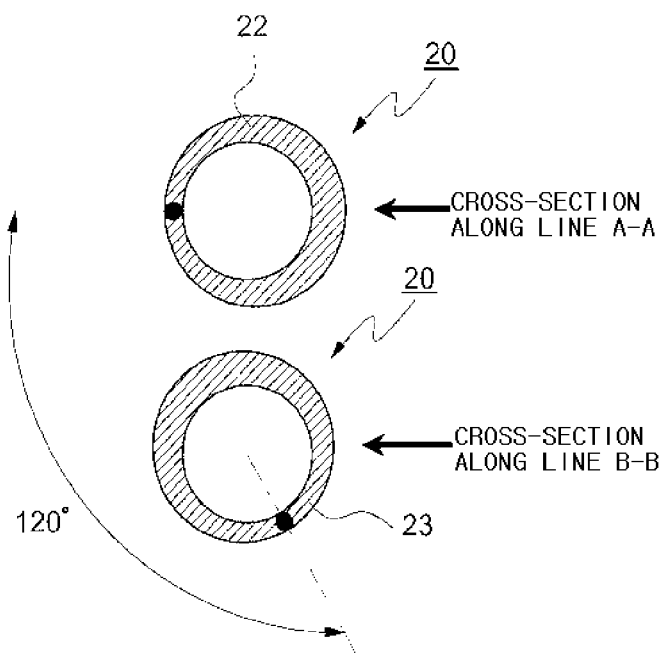
FIG. 5 is a cross-sectional view of line A-A of FIG. 4 for illustrating a phase difference between an upper bearing seat and a lower bearing seat.

At this time, the upper needle bearing (40) and the lower needle bearing (50) spontaneously come to have a phase difference (120°), once the upper needle bearing (40) and the lower needle bearing (50) are press-fitted into the upper bearing seat (22) and the lower bearing seat (23) that are designed with a predetermined phase difference, as illustrated in FIG. 5. Therefore, there is no additional operation needed for adjusting a phase difference to thereby enable to perform an easy coupling work. Thereafter, disengagement prevention devices are coupled to prevent the upper needle bearing (40) and the lower needle bearing (50) from being disengaged.

Successively, in a case the rotation shaft (11) of the motor body (10) is press-fitted by the bore (21) of the assembly-completed sleeve (20), all the coupling processes of the ABS motor according to the present invention are done.

INDUSTRIAL APPLICABILITY

The ABS motor for vehicles according to the present invention has industrial applicability in that the motor can take the eccentric shape on the whole, because a sleeve having an eccentricity-shape is coupled to a rotation shaft of mass-produced motor, thereby facilitating an easy coupling of needle bearings and enhancing the reliability of the product.

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

The invention claimed is:

1. An ABS motor for vehicles, the motor comprising:
 a motor body having a rotation shaft;
 a sleeve coupled to the rotation shaft, and including an upper bearing seat and a lower bearing seat each eccentrically provided at a periphery of the sleeve, and a compartment protruder interposed between the upper and lower bearing seats;
 an upper needle bearing coupled to the upper bearing seat; and
 a lower needle bearing coupled to the lower bearing seat;
 wherein the lower bearing seat has a phase difference in the circumferential direction with respect to the upper bearing seat;
 wherein the compartment protruder is integrally formed with the upper and lower bearing seats;
 wherein the rotation shaft is integrally formed with a same diameter through the upper needle bearing, the compartment protruder, and the lower needle bearing; and
 wherein the sleeve has an uneven thickness in a radial direction, and a thickest part of the sleeve in the radial direction is smaller than a radius of the rotation shaft.

2. The ABS motor for vehicles of claim 1, further comprising disengagement prevention devices each provided at an upper side of the upper bearing seat and at a lower side of the lower bearing seat to prevent the upper needle bearing and the lower needle bearing from being disengaged.

3. The ABS motor for vehicles of claim 2, wherein the upper and lower disengagement prevention devices are eccentrically formed.

4. The ABS motor for vehicles of claim 1, wherein the phase difference is 120° in the circumferential direction with respect to the upper bearing seat.

* * * * *